June 10, 1930. C. A. MOORE 1,762,519
BRINE COOLER
Filed April 22, 1926

Inventor
Charles A. Moore
By Bradbury + Caswell
Attorneys

Patented June 10, 1930

1,762,519

UNITED STATES PATENT OFFICE

CHARLES A. MOORE, OF EDINA, MINNESOTA

BRINE COOLER

Application filed April 22, 1926. Serial No. 103,778.

My invention relates to improvements in brine coolers for use in connection with refrigerating appliances embodying circulating brine as the refrigerating medium.

In many of the conventional refrigerating appliances, systems of pipes for brine are employed, said pipes being connected in a circuit including a pump for forcing the brine through said pipes and also including a cooler tank for the brine, said tank containing coils for ammonia or other refrigerant serving to reduce the temperature of the brine in its passage through the cooler tank.

It is to such cooler tanks that my invention particularly pertains, one object of the invention being to provide a brine cooler, wherein the terminals of the brine feed and return mains are constructed and arranged in a manner causing the effective reduction in temperature of the circulating brine, whereby a stimulated flow of the brine through a refrigerating appliance may be accommodated.

Another object of the invention is to further the effectiveness of the cooling of the brine in such a cooling tank by arranging the refrigerant coils to accord with the structure and arrangement of the brine feed and return terminals.

A further object is to dispose the elements of the cooler in such relation, that a connective and diffused circulation of the brine is set up by the pump within the tank about the refrigerant coils, which circulation is augmented by gravity.

With the foregoing and other objects in view, which will appear in the following description, the invention resides in the novel combination and arrangement of parts and in the details of construction hereinafter described and claimed.

Figure 1:
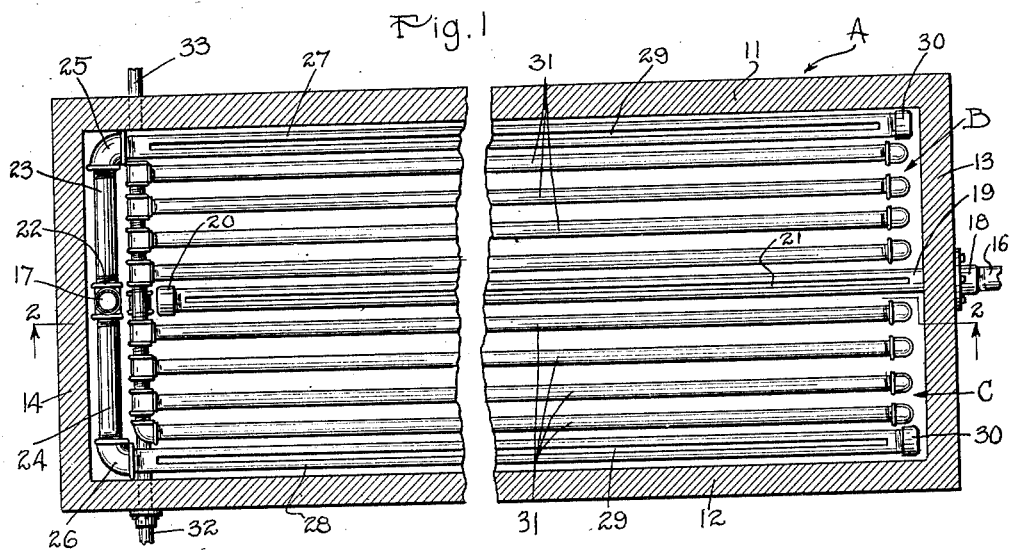
Figure 2:
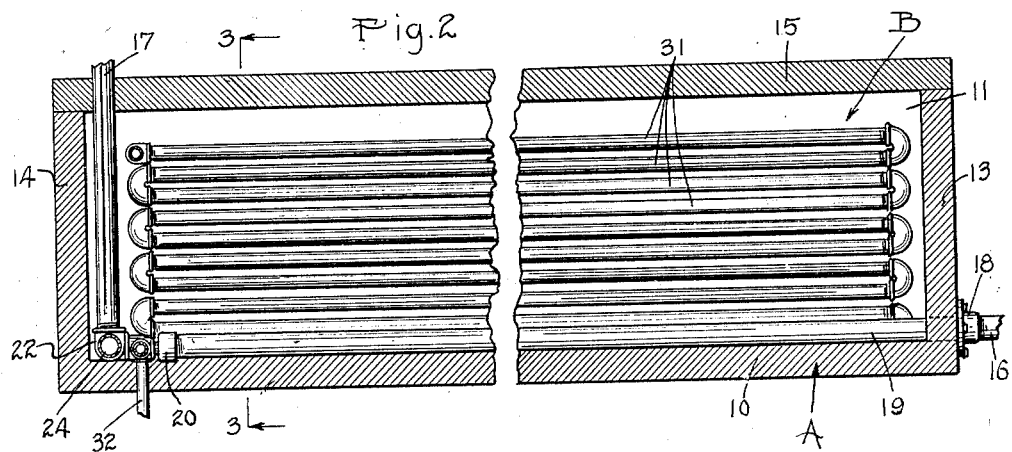
Figure 3:
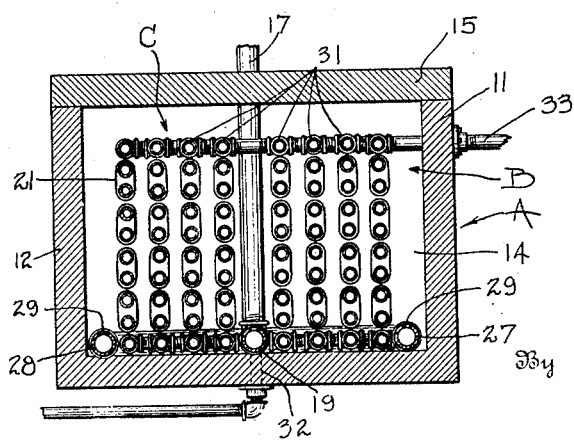

In the drawings, Fig. 1 is a view in plan of a brine cooler embodying my invention, the cover of the tank being removed; Fig. 2 is a vertical, longitudinal sectional view of the cooler, said view being taken on the line 2—2 of Fig. 1 and Fig. 3 is a vertical sectional view taken on the line 3—3 of Fig. 2.

Reference being had to the accompanying drawing, it will be seen that the illustrated embodiment of my invention includes an elongated tank indicated in its entirety by the reference character A. This tank comprises a bottom 10, sidewalls 11 and 12, endwalls 13 and 14 and a cover 15, which parts may be constructed in any approved manner providing for the effective insulation of the contents of the tank. The usual refrigerating systems or appliances with which my improved cooler is adapted to be used includes a brine feed main and a brine return main, the former having a pump (not shown) incorporated therein. Such brine feed and return mains are respectively indicated by the reference numerals 16 and 17. The brine feed main 16 is fitted at its receiving end in a flange coupling 18 bolted to the end wall 13 of the tank A. Within said tank, I provide a brine feed terminal consisting of a pipe 19, one end thereof passing through said endwall 13 and threaded into said flange coupling 18, the other end of said pipe being closed by means of a cap 20. This terminal pipe extends along the bottom 10 of the tank A midway between the sidewalls 11 and 12 thereof, said pipe being formed with a slot 21 in its upper side extending practically throughout the entire length thereof. Thus slotted, said terminal pipe 19 provides for the egress of fluid from the tank A as will more fully hereinafter appear. The return main 17 depends into the tank A near the endwall 14, the lower end of said main 17 being fitted at the bottom of the tank with a T coupling 22 from which issue two branch pipes 23 and 24. These branch pipes 23 and 24 are respectively supplied with L fittings 25 and 26 into which brine return terminals 27 and 28 are respectively threaded. Each of said terminals comprises a pipe slotted, as at 29, at the upper side and longitudinally thereof, each pipe being fitted with a cap 30 at the end thereof opposite its point of connection with its respective branch pipe. Like the terminal feed pipe 19, the terminal return pipes 27 and 28 extend along the bottom 10 of the tank A from the endwall 13 to the endwall 14. Within the tank A are two groups B and C of elongated banked coils 31, the group B being disposed between the terminal feed pipe 19 and the terminal return pipe 27, while the group C occupies position between said feed pipe 19 and the second terminal return pipe 28. These banked coils 31 are individually fed from beneath with a suitable refrigerant through a feed pipe 32 entering the tank through the bottom 10 thereof, said banks of coils 31 all being connected with a return pipe 33 issuing through the sidewall 11 of said tank. The banks of coils 31 in each group are uniformly spaced apart vertically, said groups being spaced at greater distances from each other and from the adjacent sidewalls of the tank A. That is to say, the inner banked coils 31 of the two groups B and C are relatively widely spaced apart to provide an unobstructed vertical space above the slot 21 in the terminal return pipe 19, while the outer banked coils of said groups B and C are relatively widely spaced respectively from the sidewalls 11 and 12 to provide unobstructed vertical spaces above the slots 29 in the terminal return pipes 27 and 28.

Brine or other fluid in the tank A is reduced in temperature by the refrigerant such as ammonia or the like passing through the coils 31.

The cooled brine has egress from the lower portion of the tank A through the slotted terminal feed pipe 19, under the action of the usual pump incorporated in the feed main 16. Such pump, after propelling the brine through the associated refrigerating system, forces the then warmed brine back to the tank A, said brine having ingress to said tank through the slotted terminal return pipes 27 and 28. The upward introduction of brine at the sides of the tank and the downward withdrawal of brine along the center thereof, under the action of the pump, sets up a convective and diffused circulation of brine, about the refrigerant coils 31, which circulation is augmented by gravity. In this connection, it will be comprehended that the brine along the relatively warm sidewalls 11 and 12 will rise, while the brine medially of the tank and remote from said sidewalls will descend under the extreme cooling effect experienced between the two groups B and C of coils 31. Thus, it will be understood that the circulation of brine within the tank A under the natural laws corresponds with the circulation thereof under the action of the pump of a refrigerating system, which circumstance is attended with maximum efficiency in the present invention.

Changes in the specific form of my invention, as herein disclosed, may be made within the scope of what is claimed without departing from the spirit of my invention.

Having described my invention, what I claim as new and desire to protect by Letters Patent is:

1. In combination with the feed and return mains of a fluid circulating system, an elongated tank, a terminal feed pipe opening into the feed main and extending along the floor of the tank medially thereof from one end to the other, said terminal pipe having a slot formed longitudinally thereof in its upper side, terminal return pipes connected with said return main, said pipes also extending along the bottom of said tank, one adjacent to one sidewall of the tank and the other adjacent to the opposite sidewall, each of said terminal return pipes having a slot formed longitudinally thereof in its upper side, and two groups of elongated refrigerant coils lengthwise disposed longitudinally of said tank within the same, said groups of coils being spread apart medially of the tank to provide a clear vertical space above the slot in the terminal feed pipe and each of said groups of coils being spaced from the sidewall of the tank nearest thereto to provide a clear vertical space above the slot in the terminal return pipe adjacent to said sidewall.

2. A fluid cooler comprising a tank, two groups of banked refrigerant coils within the tank; said groups of coils being spaced apart from each other to provide a clear vertical space therebetween, each group of coils being spaced from the adjacent sidewall of said tank to provide a clear vertical space between the same and such sidewall, means for introducing fluid into the tank along the bottom thereof at the lower portions of the clear vertical spaces next to said sidewalls and means for withdrawing fluid from the tank along the bottom thereof at the lower portion of the clear vertical space between said groups of coils.

In testimony whereof, I have signed my name to this specification.

CHARLES A. MOORE.